United States Patent [19]

Johns-Vano et al.

[11] Patent Number: 6,026,490

[45] Date of Patent: *Feb. 15, 2000

[54] CONFIGURABLE CRYPTOGRAPHIC PROCESSING ENGINE AND METHOD

[75] Inventors: Kerry Lucille Johns-Vano, Scottsdale; David Michael Harrison, Mesa, both of Ariz.; Phillip Anthony Carswell, Garland, Tex.; William Louis Perea, Chandler, Ariz.; Ty Bao Lien, Tempe, Ariz.

[73] Assignee: Motorola, Inc., Schaumburg, Ill.

[*] Notice: This patent is subject to a terminal disclaimer.

[21] Appl. No.: 08/904,991

[22] Filed: Aug. 1, 1997

[51] Int. Cl.[7] ........................................................ H04K 1/00
[52] U.S. Cl. ............................ 713/200; 380/28; 712/228; 712/229; 712/245; 709/1; 709/107; 709/108
[58] Field of Search .......................... 380/21, 3; 714/820, 714/821, 822, 824, 819

[56] References Cited

U.S. PATENT DOCUMENTS 4,887,239  12/1989  Turner ...................................... 365/185
5,369,314  11/1994  Patel et al. ................................ 326/13

OTHER PUBLICATIONS

An Article entitled "CRYPRIS*CrYPtographic Reduced Instruction Set Microprocessor" from Lockheed Martin.

*Primary Examiner*—Gail O. Hayes
*Assistant Examiner*—Christopher M. Tucker
*Attorney, Agent, or Firm*—Gregory J. Gorrie

[57] ABSTRACT

A configurable cryptographic processing engine (100) provides high performance cryptographic processing support for symmetric combiner type cryptographic algorithms. As many as two independent cryptographic algorithms may be performed at the same time through the processes of background staging and algorithm multi-tasking. A 3-stage instruction pipeline, dynamically configurable cryptographic co-processor (550), and 32-bit RISC based architecture support high performance cryptographic processing performance on the order of 60 Mbps aggregate throughput.

25 Claims, 2 Drawing Sheets

CONFIGURABLE CRYPTOGRAPHIC PROCESSING ENGINE AND METHOD

CROSS-REFERENCE TO RELATED APPLICATIONS

This application is related the following to co-pending U.S. Patent Application Serial Numbers which is assigned to the same assignee as the present application:

1) Ser. No. 08/841,314 filed on Apr. 28, 1997 entitled "Programmable Crypto Processing System and Method";

2) Ser. No. 08/922,056 filed on Sep. 02, 1997 entitled "Cryptographic Processing system with Programmable Function Units and Method"; and 3) Ser. No. 08/949,082 filed on Oct. 10, 1997 entitled "Method and System for Managing Data Unit Processing".

FIELD OF THE INVENTION

This invention relates in general to the field of secure cryptographic communications.

BACKGROUND OF THE INVENTION

Trends in the communications market have clearly defined the need for security for both commercial and military markets. As communications systems become more sophisticated with complex communication services and capabilities, it is important to keep information secure. One of the problems with secure equipment is interoperability between existing and future communications products. As new products are introduced and expected to become part of a larger secure communications system, the need for integrating legacy and emerging technology becomes imperative. Another problem with modern communications equipment is that secure hardware implementations are commonly difficult to design and expensive to manufacture. The manufacture of secure hardware often requires special semiconductor foundries which operate in an expensive, high security environment. Another problem with hardware implementations of secure communications equipment is the difficulty in reconfiguring the hardware. Typical hardware implementations are difficult to reconfigure and reprogram when equipment must perform various functional activities in a non-homogeneous communications environment.

Communications equipment implemented with software, however, are typically not considered as secure as hardware implementations because of the accessibility of the software. A typical problem with software implementations is that concurrent processing of multiple programs results in performance loss due to program swapping in a secure operating system.

Thus, what is needed are an improved cryptographic processing engine and method suitable for use in cryptographic systems. What is also needed are a cryptographic processing engine and method that provides interoperability between existing and emerging communications technologies. What is also needed is a cryptographic processing engine that does not include cryptographic programs during manufacture and can be fabricated in commercial semiconductor foundries thereby reducing costs. What is also needed is a cryptographic engine and method which are configurable and programmable and capable of performing various and changeable communications functions. What is further needed is a cryptographic engine and method which provide a high security software component with limited accessibility. What is also needed is a cryptographic engine and method which rapidly and securely switches programs and context for each data member processed.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a configurable processing engine and method. The present invention also provides a cryptographic processing engine and method suitable for providing interoperability between existing and emerging communications technology. The present invention also provides a cryptographic processing engine suitable for manufacture in commercial semiconductor foundries thereby reducing manufacturing costs. The present invention also provides a cryptographic engine and method which is configurable, programmable, and capable of performing various and changeable communications functions. The present invention also provides a cryptographic engine and method which provide a high security software component with limited accessibility. The present invention further provides a cryptographic engine and method which rapidly and securely switches programs and context for each data member processed.

Figure 1:
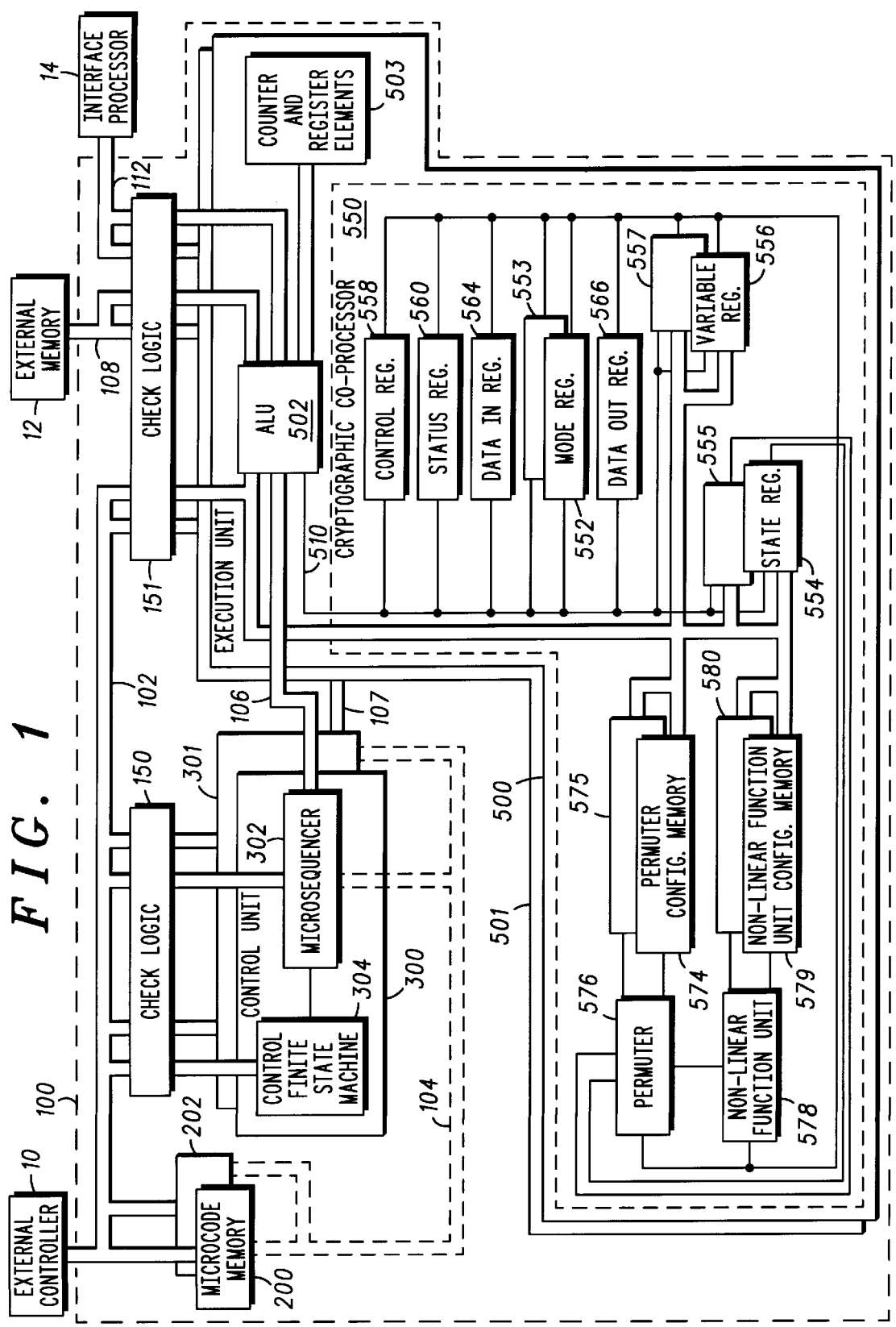
FIG. 1 illustrates a hardware block diagram of a configurable cryptographic engine (CCE) in accordance with a preferred embodiment of the present invention.

FIG. 1 illustrates a hardware block diagram of a configurable cryptographic engine (CCE) in accordance with a preferred embodiment of the present invention. In the preferred embodiment, CCE 100 includes microcode memories 200 & 202, control units 300 & 301, execution units 500 & 501, and check logic 150 & 151.

Microcode memories 200 & 202 are coupled to external controller 10, check logic 150 & 151, control units 300 & 301, and execution units 500 & 501 through interface and control bus 102. Microcode memories 200 & 202 are also coupled to control units 300 & 301 through address and data bus 104. Each microcode memory may perform either as an "active" and "shadow" microcode memory element.

Active and shadow are titles associated with selected elements of CCE 100 which are related to procedures associated therewith. For example, when CCE 100 is being setup and configured to perform an operation, this procedure is performed in "background staging" mode. Background staging is a mode where a setup and configuration procedure is performed which prepares CCE 100 to process data. Elements, such as memory, registers, and others, which are associated with background staging mode are titled "shadow" elements. Elements which are titled shadow elements are determined preferably by external controller 10. Alternatively, an example of "active" mode elements is when shadow elements previously associated with the background staging mode are currently being used in processing data. More specifically, elements titled shadow during a setup and configuration procedure are titled active when those same elements are used in processing data. Other examples of active and shadow elements are when microcode memory 200 is titled the shadow memory and microcode memory 202 is titled the active memory and vice versa.

Control units 300 & 301 are coupled to external controller 10, microcode memories 200 & 202, check logic 150 & 151, and execution units 500 & 501 through interface and control bus 102. Control units 300 & 301 are also coupled to execution units 500 & 501 through status and control bus 106 & 107, respectively. In the preferred embodiment, control units 300 & 301 each contain microsequencer 302. In another embodiment, control units 300 & 301 also each contain control finite state machine 304 (CFSM). In an embodiment having CFSM 304, CFSM 304 is comprised of hardware control logic and software which, among other things, monitors for alarms and provides high level control of microsequencer 302. In the preferred embodiment, control unit 300 and redundant control unit 301 each contain microsequencer 302 which provides software control of CCE 100. Software control may also provide, for example, monitors for alarms, status and other types of operations. Preferably, control units 300 & 301 each perform redundant functionality of the other.

Execution units 500 & 501 are coupled to external controller 10, microcode memories 200 & 202, control units 300 & 301, and check logic 150 & 151 through interface and control bus 102. Execution units 500 & 501 are also coupled to control units 300 & 301 through 106 & 107, respectively. Execution units 500 & 501 are also coupled to external memory 12 through address and RAM bus 108. Furthermore, execution units 500 & 501 are coupled to interface processor 14 through interface processor bus 112. In the preferred embodiment, execution units 500 & 501 each contain Arithmetic Logic Unit 502 (ALU), counter and register elements 503, and cryptographic co-processor 550 (CCO). In the preferred embodiment, ALU 502, counter and register elements 503, and CCO 550 are internally coupled through output bus 510. Preferably, execution units 500 & 501 each perform redundant functionality of the other. Additionally, the combination of microsequencer 302, ALU 502, and counter and register elements 503 function like a 32-bit RISC processor.

CCE 100 is a dynamically configurable cryptographic processing engine which, when configured, performs cryptographic operations on data units, e.g., preformatted data packets of information. CCE 100 is setup and configured by external controller 10. Preferably, external controller 10 performs a setup and configuration procedure for a channel program which prepares CCE 100 for processing data units. A channel program comprises a set of software program instructions which perform, among other things, cryptographic operations on a data unit. A channel program is preferably created by means external to the CCE. External controller 10 preferably provides external control when preparing CCE 100 for processing data units. A data unit is preferably stored in external memory 12 prior to processing. Following the processing of data units, a data unit is preferably written to external interface processor 14.

In the preferred embodiment, external controller 10 performs a setup and configuration procedure for a channel program. While performing this setup and configuration procedure, external controller 10 loads a channel program from external memory 12 into the shadow microcode memory, either memory 200 or 202. External controller 10 determines the microcode memory to receive a channel program. In the preferred embodiment, external controller 10 determines which microcode memory 200 or 202 is the shadow microcode memory to receive a channel program.

External controller 10 provides control over control units 300 & 301. Preferably, control unit 300 and redundant control unit 301 execute the same channel program from the active microcode memory. Control units 300 & 301 are comprised of functionally similar hardware and software although each control unit may contain hardware and software which is the logical complement of the other. A first check logic 150 examines outputs from control units 300 & 301 to provide an inspection of output values. In the preferred embodiment, first check logic 150 provides an alarm to external controller 10 when control units 300 & 301 produce conflicting output values. CCE 100 will also function without the redundant control unit and redundant execution unit.

Among other things, control units 300 & 301 each contain microsequencer 302. In the preferred embodiment, microsequencer 302 contains a 3-stage pipeline to perform, for example, fetch, execute, and write operations on the channel program instructions in microcode memory. During the fetch operation, microsequencer 302 retrieves the next channel program instruction from active microcode memory. During the execute operation, for example, microsequencer 302 executes the previously retrieved channel program instruction. In the preferred embodiment, executing a channel program instruction may include, for example, loading channel program variables from external memory 12 into execution units 500 & 501 (EUs) registers or providing processed output data to external interface processor 14.

Preferably, EUs 500 & 501 provide cryptographic algorithm support for microsequencer 302. EUs 500 & 501 are configurable elements which perform, among other things, cryptographic combiner type operations on data units. Preferably, EUs 500 & 501 are pre-configured to perform cryptographic combiner type operations to support channel programs executed by associated microsequencer 302. EUs 500 & 501 are preferably pre-configured during a channel program setup and configuration process.

Among other things, EUs 500 & 501 are each comprised of ALU 502, counter and register elements 503, and CCO 550. Counter and register elements 503 are preferably comprised of hardware including counters, general and dedicated purpose registers, shift registers, and active and shadow data unit address registers. Each ALU 502 and counter and register elements 503 combination perform, among other things, channel program instructions forwarded from microsequencer 302, load and store register operations, arithmetic and bit shift operations including, for example, a logical and of two 32-bit values and left and right bit shift operations. In the preferred embodiment of the present invention, active and shadow data unit address registers are read-only registers by CCE 100. In the preferred embodiment, active and shadow data unit address registers contain an external memory 12 address of a data unit. Preferably, external controller 10 selects one data unit address register as the shadow register for EUs 500 & 501.

CCO 550 is preferably configured to perform combiner type cryptographic operations. CCO 550 is preferably controlled directly by the coupled ALU 502 and counter and register elements 503 and indirectly by microsequencer 302 and instructions for a channel program performed by ALU 502, counter and register elements 503, and microsequencer 302. In the preferred embodiment, CCO 550 includes, among other things, mode registers 552 & 553, state registers 554 & 555, variable registers 556 & 557, control register 558, status register 560, data in register 564, data out register 566, permuter configuration memories 574 & 575, permuter 576, non-linear function unit (NLFU) configuration memories 579 & 580, and NLFU 578. In cases where there are two of a register type, e.g., mode, state, variable, and data unit address, one of these register sets is titled the active register set and the other is the shadow register set. Also, where there are two of a memory type, e.g., configuration memories for the permuter and configuration memories for the NLFU, one configuration memory for each is titled the active configuration memory and the other is the shadow configuration memory. As described above for active and shadow elements, either register set or configuration memory may be titled active or shadow register set or configuration memory, respectively, as determined by external controller 10. As described below, CCO 550 registers and configuration memories are configured during a setup and configuration process. Although the preferred embodiment is described as having one active and one shadow of each register set and configuration memory, there may be several shadow registers and configuration memories for non-active channel information.

In the preferred embodiment, the mode register stores, among other things, data used in cryptographic combiner type operations performed by permuter 576 and NLFU 578. Preferably, both active and shadow mode registers are 105-bit registers. Active and shadow state registers 554 & 555 preferably contain channel program state information of the channel program associated therewith. Channel program state is represented by data in the associated 224-bit state register. Active and shadow variable registers 556 & 557 preferably contain channel program variables for the channel program associated therewith. A channel program variable is represented by data in the associated 224-bit variable register. An example of a channel program variable may be a public key encryption key for encrypting plain-text data.

In the preferred embodiment, control register 558 preferably contains control data which determines, among other things, which elements (e.g., register sets, multiplexers, programmable logic, etc.) are active and which are shadow for CCO 550. In the preferred embodiment, when microsequencer 302 loads control data into control register 558, CCO 550 is signaled to begin pre-configured processing. When processing is complete for pre-configured CCO 550, a status register flag is set which signals microsequencer 302 that CCO 550 is available for further processing. Status register 560 is preferably monitored by microsequencer 302 to determine CCO 550 completion status.

In the preferred embodiment, microsequencer 302 loads data in register 564. Among other things, data in register 564 stores the next dword, e.g., a 32-bit element of a data unit, which is processed by CCO 550. When CCO 550 processing is complete for a dword, the processed dword is loaded into data out register 566.

Permuter 576 and NLFU 578 are comprised of hardware and software which are dynamically configurable. When configured, permuter 576 and NLFU 578 may perform cryptographic operations, e.g., symmetric combiner type cryptographic algorithms. In the preferred embodiment, 113 permuter elements are each comprised of a 6-bit control register which configures a 3-stage multiplexer to select 1 of 64 input bits from the associated state register. A 1-bit output from each 113 permuter element is forwarded to NLFU 578. Each of the NLFU's 7 non-linear arrays is comprised of six 12:1, nine 6:1, and seventeen 2:1 NLFUs. Each NLFU array is comprised of configurations of non-linear function units which combine mode, variable, state, and data from a data unit to create a processed dword. In the preferred embodiment, a processed dword may represent, for example, cipher-text, plain-text data, and key stream data.

In the preferred embodiment, CCE 100 may be fabricated in a multi-chip module, custom cell design, gate array, field programmable gate array, or other technology providing approximately 1.8 million transistors.

Figure 2:
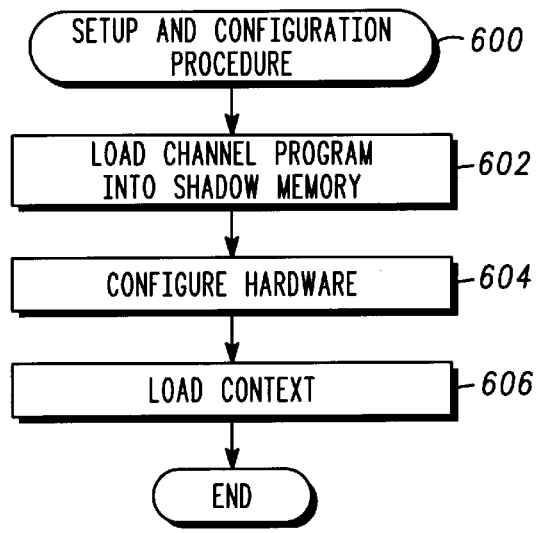
FIG. 2 is a flow chart of a CCE setup and configuration procedure in accordance with a preferred embodiment of the present invention.

FIG. 2 is a flow chart of a CCE setup and configuration procedure in accordance with a preferred embodiment of the present invention. Procedure 600 is preferably performed by an external controller for, among other things, loading a channel program and hardware configuration information into CCE 100 (FIG. 1). The instructions of the channel program and hardware configuration information are preferably loaded into CCE shadow elements. In the preferred embodiment, procedure 600 is performed in a background staging mode for CCE 100 (FIG. 1).

In task 602, a channel program is loaded into memory. In the preferred embodiment, an external controller copies a channel program from an external memory into shadow microcode memory. Permuter configuration data and NLFU configuration data are also copied from an external memory into shadow configuration memories and are considered part of the channel program. Preferably, permuter configuration data is copied into a shadow permuter configuration memory and NLFU configuration data is copied into a shadow NLFU configuration memory. An external controller determines which memories are in the shadow state.

In task 604, configuration data is loaded into a mode register, multiplexer, and programmable logic of CCO 550 (FIG. 1). In the preferred embodiment, an external controller copies the configuration data from an external memory. Configuration data is preferably created by means external to the CCE. Configuration data comprises data which configures hardware to perform symmetric combiner type cryptographic operations on data units. Preferably, cryptographic operations are performed under control of the channel program in task 602. Configuration data is preferably comprised of mode, permuter, and NLFU data. Mode data is information used by a channel program in symmetric combiner type cryptographic operations in the NLFU. Mode data is preferably stored in the shadow mode register of CCO 550 (FIG. 1). Permuter data is comprised of data for use in configuring a shadow multiplexer which selects state register output bits. Accordingly, the multiplexer controls data flow from the associated state register into the permuter. NLFU data is comprised of data for use in configuring shadow programmable logic. In the preferred embodiment, programmable logic is a collection of NLFU arrays which perform operations on 14 dwords, e.g., 7 dwords of state data and 7 dwords of variable data simultaneously.

In task 606, a channel program context is loaded into a state register, variable register, and data unit address register of EUs 500 & 501 (FIG. 1). The channel program context is comprised of state and variable data associated with a channel program and address data associated with a data unit.

State data represents a channel program state. In the preferred embodiment, state data may contain, for example, channel program data representing the current state of execution for a process such as encryption. Maintaining the state data allows a channel program to be resumed after being swapped from shadow registers and memories to active registers and memories. Initial state data is preferably written to the shadow state register prior to channel program execution.

Variable data represents a channel program variable. In the preferred embodiment, variable data may contain, for example, a cryptographic encryption key for use in performing cryptographic operations in CCO 550 (FIG. 1). Initial variable data is preferably written to the shadow variable register prior to channel program execution.

Address data for a data unit represents the external memory address of a data unit associated therewith. The address references a data unit comprising, among other things, a header and payload data. Preferably, the header contains two dwords which include, for example, a reference to a destination location. A destination location is an output location where processed dwords are written. Payload data contains, among other things, dwords to be processed by the channel program in task 602. In the preferred embodiment, payload data size is between 1 and 4094 dwords although other sizes are suitable. The address for the data unit is preferably stored in the shadow data unit address register of counter and register elements 503 (FIG. 1).

Figure 3:
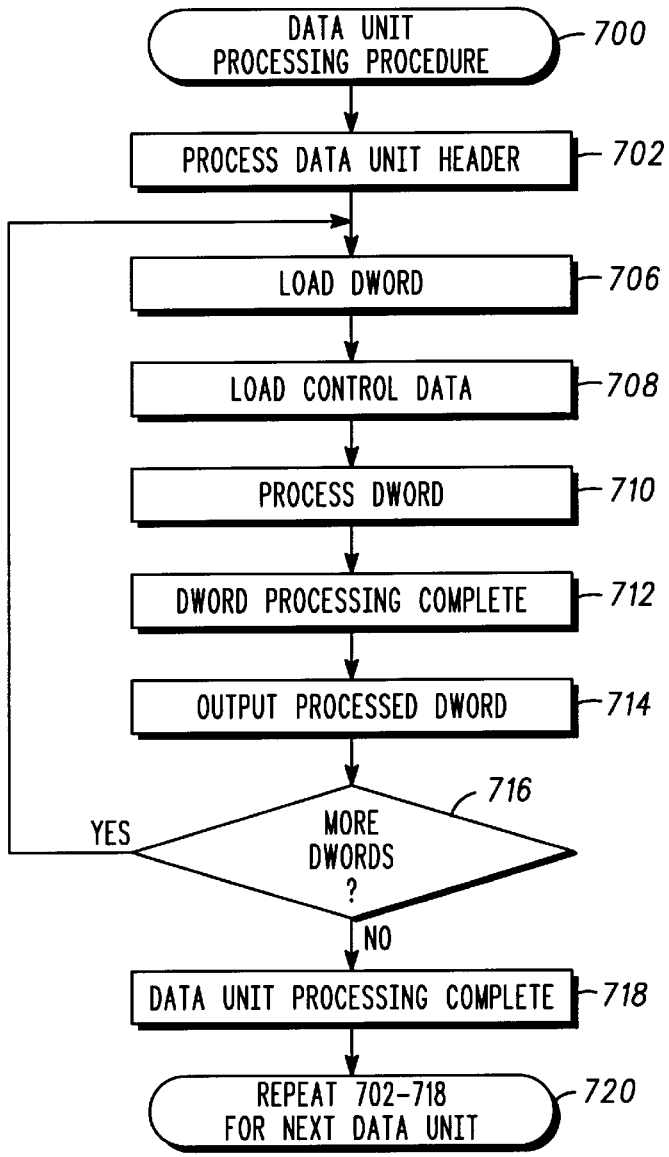
FIG. 3 is a flow chart of a data unit processing procedure in accordance with a preferred embodiment of the present invention.

FIG. 3 is a flow chart of a data unit processing procedure in accordance with a preferred embodiment of the present invention. Data units are preferably preformatted as discussed above. Data unit processing procedure 700 is preferably performed by CCE 100 (FIG. 1) for, among other things, processing a data unit. Examples of processing a data unit are encryption of plain-text data, decryption of cipher-text data, processing of in-band signaling required for bit, word, or frame formatting, detection of in-band signals, or instruction for operations such as receive over-the-air-rekey (OTAR) data. In the preferred embodiment, the active elements of procedure 700 were titled the shadow elements in procedure 600 (FIG. 2). Also, in the preferred embodiment, procedure 700 is performed concurrently with procedure 600.

In task 702, the header of the data unit is processed. In the preferred embodiment, the microsequencer of each control unit fetches and executes instructions of the same channel program from active microcode memory. The microsequencer also performs any write operations external to the CCE as a result of performing instructions. In the preferred embodiment, instructions of the channel program direct the microsequencer to copy the header of the data unit from external memory to a destination location. The destination location is preferably determined by information contained within the header of the data unit. In the preferred embodiment, the destination location is a storage location such as external memory or an external controller or processor. In another embodiment of the present invention, the destination location may be a "temporary" memory location in an external interface processor.

In task 706, a portion of the payload data is loaded into the data in register. In the preferred embodiment, the payload portion loaded into the data in register is one dword of the payload data. Similar to task 702, the microsequencer fetches, executes, and writes data external to the CCE when performing instructions of the channel program. Preferably, the instructions of the channel program performed in task 706 load a dword into the data in register.

In task 708, control data is written into the control register. In the preferred embodiment, the microsequencer determines the control data from instructions of the associated channel program. Among other things, control data provides information to the redundant execution units which determines the active register set in each. After the control register is loaded with control data, the microsequencer signals the associated permuter and NLFU to perform their pre-configured cryptographic operations.

In task 710, a portion of payload data is processed. In the preferred embodiment, the processed payload portion is one dword of the payload data. The dword loaded into data in register 564 (FIG. 1) in task 706 is processed by CCO 550 (FIG. 1). Preferably, the CCO is pre-configured by procedure 600 (FIG. 2) to perform operations on the dword. After the CCO completes its operations, the processed dword is written to data out register 566 (FIG. 1).

In task 712, a processing complete flag is set in the status register of CCO 550 (FIG. 1). In the preferred embodiment, the microsequencer monitors the associated status register to determine when cryptographic operations are complete for the dword in task 710. Since the microsequencer is both independent and in control of operations performed by the associated CCO, the microsequencer may perform other instructions of the channel program while the associated CCO performs pre-configured operations.

In task 714, a processed dword is written to output. In the preferred embodiment, when operations on a dword are complete, the processed dword is written to an output destination. Preferably, the output destination is specified in the header of the associated data unit. In another embodiment, the output destination may be implied by the channel program being executed. In the preferred embodiment, a header may specify, for example, that processed dwords be written to an external memory or interface processor. Preferably, second check logic 151 (FIG. 1) provides an alarm to external controller 10 (FIG. 1) when EUs 500 & 501 (FIG. 1) produce conflicting output values.

In task 716, a check for additional dwords is performed. In the preferred embodiment, the microsequencer determines the number of dwords in a data unit to process. Preferably, the microsequencer determines the number of dwords to process from payload size information in the header of the data unit. If the microsequencer determines other dwords require processing, task 706 is performed by the microsequencer. If the microsequencer determines no other dwords require processing, task 718 is performed by the microsequencer. In task 718, the microsequencer signals the external controller that processing for a data unit is complete. In the preferred embodiment, the microsequencer signals the external controller by setting a "done" bit in the function register of associated counter and register elements 503 (FIG. 1). The function register is a dedicated purpose register in counter and register elements 503 which, among other things, communicates status information between the redundant microsequencers and external controller.

In task 720, tasks 702–718 are repeated for other data units. In the preferred embodiment, the CCE performs procedure 700 on additional data units requiring the first channel program described above. Alternatively, a second channel program may be performed on a data unit, without destroying the first channel program instructions, program context, and hardware configuration information. Because the CCE contains shadow and active elements, two separate channel programs, program contexts, and hardware configurations may be maintained by the CCE. Making use of background staging mode, the CCE may perform, among other things, high performance cryptographic processing operations for symmetric combiner type algorithms.

Thus, an improved cryptographic processing engine and method have been shown. What has also been shown are a configurable, programmable cryptographic processing engine and method suitable for providing interoperability between existing and emerging communications technology. What has also been shown is a cryptographic processing engine suitable for manufacture in commercial semiconductor foundries thereby reducing manufacturing costs. What has further been shown are a cryptographic engine and method which are configurable, programmable, and capable of performing various and changing communications functions. Also shown are a cryptographic engine and method which provide a high security software component with limited accessibility. What has also been shown are a cryptographic engine and method which rapidly and securely switches programs and context for each data member processed.

What is claimed is:

1. A configurable cryptographic engine comprising:
   a first and second microcode memory for storing respective first and second channel programs;
   a microsequencer for processing one of said channel programs; and
   an execution unit having first and second registers for storing respectively, first and second context associated respectively with said first and second channel programs,
   wherein said microsequencer configures said execution unit in response to said first channel program and said execution unit processes a first data unit in accordance with said first context and said first channel program, and
   wherein said second channel program is loaded into said second microcode memory and said second context is loaded into said second registers during the processing of said first data unit for subsequently processing a second data by said execution unit.

2. A configurable cryptographic engine as claimed in claim 1 wherein said microsequencer further configures said execution unit in response to said second channel program and said execution unit processes a second data unit in accordance with said second context.

3. A configurable cryptographic engine as claimed in claim 1 wherein said first and second microcode memories, said microsequencer and said execution unit are fabricated on a single semiconductor substrate.

4. A configurable cryptographic engine as claimed in claim 1 further comprising:
   a redundant microsequencer for processing said one channel program; and
   a redundant execution unit having redundant first and second registers for storing respectively, said first and second context associated respectively with said first and second channel programs, wherein said redundant microsequencer configures said redundant execution unit in response to said first channel program, and said redundant execution unit processes said first data unit in accordance with said first context.

5. A configurable cryptographic engine as claimed in claim 4 further comprising:
   first control logic for comparing output data of said microsequencer with output data of said redundant microsequencer; and
   second control logic for comparing execution unit output data of said execution unit with execution unit output data of said redundant execution unit.

6. A configurable cryptographic engine as claimed in claim 5 wherein said first control logic has means for notifying an external host of discrepancies between said control unit output data of said microsequencer and said redundant microsequencer.

7. A configurable cryptographic engine as claimed in claim 5 wherein said second control logic has means for notifying an external host of discrepancies between said execution unit output data of said execution unit and said redundant execution unit.

8. A configurable cryptographic engine as claimed in claim 1 wherein said execution unit includes a cryptographic co-processor having said first and second registers contained therein, said cryptographic co-processor for performing combiner-type cryptographic operations on said first data unit.

9. In a configurable cryptographic engine comprised of first and second microcode memories, a microsequencer, an execution unit that includes a cryptographic co-processor, a method for processing data units comprising the steps of:
   loading a first channel program into said first microcode memory;
   loading first configuration bits associated with said first channel program into first registers associated with said execution unit;
   loading first context of said first channel program into second registers associated with said cryptographic co-processor;
   providing, by said microsequencer, first program parameters based on said first channel program to said cryptographic co-processor for configuring said cryptographic co-processor for an operation; and
   performing, by said cryptographic co-processor, as configured with said first program parameters, said operation on a first data unit, said operation determined, at least in part, by said first channel program and said first context.

10. A method as claimed in claim 9 wherein the loading steps are performed during the processing of a second data unit by said cryptographic co-processor in accordance with a second channel program stored in said second microcode memory.

11. A method as claimed in claim 10 wherein second context associated with said second channel program is stored in third registers associated with execution unit, and
   second configuration bits associated with said second channel program are stored in fourth registers associated with said execution unit,
   said second context and said second configuration bits being used by said second channel program for processing said second data unit,
   said second data unit being a prior data unit to said first data unit in a series of data units.

12. A method as claimed in claim 11 wherein said first channel program is comprised of a set of instructions, the method further comprising the steps of:
   said microsequencer retrieving a first instruction from said set of instructions;
   said microsequencer providing said first program parameters based on said first instruction to said cryptographic co-processor to configure said cryptographic co-processor for said operation; and
   performing said operation on a first word of said first data unit, said operation determined, at least in part, by said first instruction, said first channel program, and said first context.

13. A method as claimed in claim 12 further comprising the steps of:
   loading a third channel program into said second microcode memory;
   loading third configuration bits associated with said third channel program into said fourth registers;

loading third context associated with said third channel program into said third registers; and processing a third data unit by said execution unit in accordance with said third context and configuration bits after the processing of said first data unit, the steps of loading said third channel program, said third configuration bits, and said third context being performed during the processing of said first data unit.

14. A method as claimed in claim 12 further comprising the steps of:

updating said first context in said second registers based on said operation performed on said first data unit;

repeating the steps of providing, performing said operation and updating said first context for other instructions of said set of instructions; and for other words of said first data unit, repeating the steps of retrieving, providing, performing said operation and updating said first context to create an output data unit.

15. A method as claimed in claim 10 further comprising the step of loading an address of said first data unit into an address register, and reading said first data unit from a storage location indicated by said address.

16. A method as claimed in claim 10, wherein said configurable cryptographic engine further comprises a redundant microsequencer and a redundant execution unit, the method further comprising the steps of:

providing redundant program parameters by said redundant microsequencer to said redundant execution unit in accordance with said second channel program;

processing said first data unit in said redundant execution unit;

comparing said redundant program parameters with said first program parameters; and notifying an external host of discrepancies between said redundant program parameters and said first program parameters.

17. In a configurable processing engine comprised of first and second microcode memories, a microsequencer, and an execution unit, wherein said first microcode memory has a first channel program stored therein, a method for processing data units comprising the steps of:

said microsequencer providing first configuration bits to said execution unit based on said first channel program;

said execution unit processing a first data unit based on said first configuration bits and first context associated with said first channel program, said first context being stored in a first context register associated with said execution unit; and loading a second channel program into said second microcode memory during the performance of the processing step.

18. A method as claimed in claim 17 further comprising the steps of:

loading second context associated with said second channel program into a second context register associated with said execution unit during the performance of the processing step; and said execution unit processing a second data unit based on said second context after the completion of the step of processing said first data unit.

19. A method as claimed in claim 18 further comprising the steps of:

loading a third channel program into said first microcode memory;

loading third context associated with said third channel program into said first context register; and said execution unit processing a third data unit based on said third configuration bits and third context after the completion of the step of processing said second data unit, wherein the loading said third channel program and third context steps being performed during the performance of the step of processing said second data unit.

20. A configurable cryptographic processing engine comprising:

a first control unit for performing a first channel program wherein said first channel program operates on a first data unit, said first control unit for performing a second channel program wherein said second channel program operates on a second data unit, subsequent to performing said first channel program;

a first memory for storing said first channel program;

a second memory for storing said second channel program, said second channel program being loaded in the second memory during the performance of said first channel program; and a first execution unit for performing operations on selected portions of said first data unit based on the first channel program, said first execution unit for performing operations on selected portions of said second data unit based on the second channel program, subsequent to performing operations on said first data unit.

21. A configurable cryptographic processing engine as in claim 20 further comprising:

a second control unit for performing said first channel program, concurrently during the first control units' performance of the first channel program; and a control unit check logic comparing output values of the first and second control units, and providing an alarm signal when the output values conflict.

22. A configurable cryptographic processing engine as in claim 21 comprising:

said second control unit for performing said second channel program, concurrently during the first control units' performance of the second channel program.

23. A configurable cryptographic processing engine as in claim 22 wherein each first and second control unit is comprised of:

a first microsequencer for performing fetch, execute, and write operations of each said first and second channel program, sending control data and receiving status data from said first execution unit.

24. A configurable cryptographic processing engine as in claim 20 further comprising:

a second execution unit for performing operations on selected portions of said first data unit, concurrently during the first execution units' performance of operations on selected portions of said first data unit; and a execution unit check logic comparing output values of the first and second execution units, and providing an alarm signal when the output values conflict.

25. A configurable cryptographic processing engine as in claim 24 comprising:

said second execution unit for performing operations on selected portions of said second data unit, concurrently during the first execution units' performance of operations on selected portions of said second data unit.

* * * * *